US008108136B2

(12) United States Patent
Filev et al.

(10) Patent No.: US 8,108,136 B2
(45) Date of Patent: Jan. 31, 2012

(54) DRIVER ADVISORY SYSTEM FOR FUEL ECONOMY IMPROVEMENT OF A HYBRID ELECTRIC VEHICLE

(75) Inventors: Dimitar Petrov Filev, Novi, MI (US); Fazal Urrahman Syed, Canton, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 1178 days.

(21) Appl. No.: 11/836,492

(22) Filed: Aug. 9, 2007

(65) Prior Publication Data

US 2009/0043467 A1    Feb. 12, 2009

(51) Int. Cl.
*G05G 1/38* (2008.04)

(52) U.S. Cl. .................... 701/123; 701/70; 340/439

(58) Field of Classification Search .............. 701/22, 701/57–59, 70, 98, 123; 180/65.21–65.8; 318/87; 903/902–960; 340/439
See application file for complete search history.

(56) References Cited

U.S. PATENT DOCUMENTS

| | | | |
|---|---|---|---|
| 2,692,980 | A | 10/1954 | Platt |
| 2,825,418 | A | 3/1958 | Kershman |
| 4,019,475 | A | 4/1977 | Nuss |
| 4,385,604 | A | 5/1983 | Fiala |
| 5,080,207 | A * | 1/1992 | Horneffer .................... 192/3.63 |
| 5,113,721 | A | 5/1992 | Polly et al. |
| 5,166,879 | A | 11/1992 | Greene et al. |
| 5,378,052 | A | 1/1995 | Yoshino |
| 5,627,752 | A | 5/1997 | Buck et al. |
| 5,693,876 | A * | 12/1997 | Ghitea et al. ............... 73/114.53 |
| 5,897,437 | A | 4/1999 | Nishiumi et al. |
| 6,085,725 | A | 7/2000 | Goode et al. |
| 6,092,021 | A | 7/2000 | Ehlbeck et al. |
| 6,289,332 | B2 | 9/2001 | Menig et al. |
| 6,295,500 | B1 | 9/2001 | Cullen et al. |
| 6,298,745 | B1 | 10/2001 | Rixon et al. |
| 6,309,031 | B1 | 10/2001 | Crombez et al. |
| 6,366,848 | B1 | 4/2002 | Gustavsson |
| 6,470,256 | B1 | 10/2002 | Cikalo et al. |
| 6,487,477 | B1 | 11/2002 | Woestman et al. |
| 6,507,782 | B1 | 1/2003 | Rumbo et al. |
| 6,580,417 | B2 | 6/2003 | Rosenberg et al. |
| 6,655,199 | B1 | 12/2003 | Smith |
| 6,693,622 | B1 | 2/2004 | Shahoian et al. |
| 6,708,099 | B2 | 3/2004 | Tellis et al. |

(Continued)

FOREIGN PATENT DOCUMENTS

DE    10218012    11/2003

(Continued)

OTHER PUBLICATIONS

GB Search Report for the corresponding Patent Application No. GB 0819741.0 mailed Jan. 26, 2009.

(Continued)

*Primary Examiner* — Khoi Tran
*Assistant Examiner* — Spencer Patton
(74) *Attorney, Agent, or Firm* — David B. Kelley; Brooks Kushman P.C.

(57) ABSTRACT

The invention is an intelligent advisory system, which may be based on fuzzy rule-based logic to guide a vehicle driver in selecting an optimal driving strategy to achieve best fuel economy. The advisory system includes separate controllers for providing advisory information regarding driver demand for power and advisory information regarding vehicle braking, which are conveyed to the driver.

25 Claims, 8 Drawing Sheets

U.S. PATENT DOCUMENTS

| | | | |
|---|---|---|---|
| 6,739,212 B2 | 5/2004 | Flynn | |
| 6,751,544 B2 | 6/2004 | Hashimoto et al. | |
| 6,882,915 B2 | 4/2005 | Yamamura et al. | |
| 6,904,823 B2 | 6/2005 | Levin et al. | |
| 6,907,325 B1 | 6/2005 | Syed et al. | |
| 6,925,425 B2 * | 8/2005 | Remboski et al. | 702/188 |
| 6,994,360 B2 | 2/2006 | Kuang et al. | |
| 7,006,917 B2 | 2/2006 | Hijikata | |
| 7,013,213 B2 | 3/2006 | McGee et al. | |
| 7,162,349 B2 | 1/2007 | Hijiktaka et al. | |
| 7,305,300 B2 | 12/2007 | Gibson et al. | |
| 7,403,842 B2 | 7/2008 | Yamamura et al. | |
| 7,646,289 B2 * | 1/2010 | Tamai et al. | 340/439 |
| 2001/0030658 A1 | 10/2001 | Rosenberg et al. | |
| 2001/0039230 A1 * | 11/2001 | Severinsky et al. | 477/3 |
| 2002/0095247 A1 * | 7/2002 | Ding et al. | 701/22 |
| 2002/0171541 A1 * | 11/2002 | Crombez et al. | 340/461 |
| 2003/0168266 A1 * | 9/2003 | Sasaki et al. | 180/65.3 |
| 2003/0188594 A1 | 10/2003 | Levin et al. | |
| 2003/0191573 A1 | 10/2003 | Beyer et al. | |
| 2004/0249533 A1 | 12/2004 | Wheals et al. | |
| 2005/0021226 A1 | 1/2005 | Kustosch | |
| 2005/0110348 A1 | 5/2005 | Hijikata et al. | |
| 2005/0256632 A1 * | 11/2005 | McGee et al. | 701/101 |
| 2006/0181409 A1 * | 8/2006 | Yamamoto et al. | 340/532 |
| 2007/0085667 A1 | 4/2007 | Cicilloni et al. | |
| 2007/0271026 A1 | 11/2007 | Hijikata | |
| 2007/0276582 A1 | 11/2007 | Coughlin | |
| 2008/0015767 A1 | 1/2008 | Masuda et al. | |
| 2008/0042489 A1 | 2/2008 | Lewis et al. | |

FOREIGN PATENT DOCUMENTS

| | | |
|---|---|---|
| DE | 102004010960 A1 | 10/2004 |
| FR | 2727155 | 2/2003 |
| FR | 2828155 | 2/2003 |
| JP | 2002370560 | 12/2002 |
| JP | 2003-120339 | 4/2003 |
| JP | 2003335151 | 11/2003 |
| JP | 2003343305 | 12/2003 |
| JP | 2004-314871 | 11/2004 |
| JP | 2005-132225 | 5/2005 |
| JP | 2006-316629 | 11/2006 |
| JP | 2007-076468 | 3/2007 |
| JP | 2007-182196 | 7/2007 |

OTHER PUBLICATIONS

Nissan ECO pedal technology to increase fuel efficiency by 5-10 percent, Zach Gale, Motor Trend, Automotive News.

Continental produces the first accelerator pedal that communicates with the driver, Frankfurt am Main, Germany, Aug. 11, 2008, Press release for the trade press.

Drivers, beware so-called gas aid gadgets, detnews.com, Jul. 3, 2007.

FTC Facts for Consumers, "Gas Saving" Products: Fact or Fuelishness? Sep. 2006.

OBD2A11InOne.com, May 4, 2006.

New Scientist & Peregrine, newscientist.com, May 22, 2006.

1975 AMC Pacer Home Page, 1975 Pacer by American Motors Corporation AMC coupe 1976 1977 1978 1979 1980.

Symbiotic Car: Haptic Feedback Accelerator Pedal, Volkswagen of America Electronics Research Lab.

Driving Tips. Edmunds.com, Apr. 27, 2006.

Top tips for fuel efficient driving, Shell.com, Apr. 24, 2006.

Driving Skills, drivingskillsforlife.com, May 22, 2006.

Guenter Reichart et al ., Potentials of BMW Driver Assistance to Improve Fuel Economy.

* cited by examiner

| Rule No. | If $e_{FE}$ is | If $de_{FE}/dt$ is | If $P_{eng\_act}$ is | Then $\Delta A_{u\_LIM}$ is |
|---|---|---|---|---|
| 1 | Don't Care | Don't Care | Low | Zero |
| 2 | Negative | Negative | High | Positive low |
| 3 | Zero | Negative | High | Positive |
| 4 | Positive | Negative | High | Zero |
| 5 | Negative | Zero | High | Positive |
| 6 | Zero | Zero | High | Zero |
| 7 | Positive | Zero | High | Negative |
| 8 | Negative | Positive | High | Zero |
| 9 | Zero | Positive | High | Negative |
| 10 | Positive | Positive | High | Negative |

Fig. 3

| Rule No. | If $P_{uncap}$ is | If $flag\_regen\_des$ is | Then $\Delta B_{u\_LIM}$ is |
|---|---|---|---|
| 1 | Low | Low | Low |
| 2 | Low | High | Medium |
| 3 | High | Low | Medium |
| 4 | High | High | High |

DRIVER ADVISORY SYSTEM FOR FUEL ECONOMY IMPROVEMENT OF A HYBRID ELECTRIC VEHICLE

BACKGROUND OF THE INVENTION

1. Field of the Invention

The invention relates to a vehicle driver advisory controller for guiding a driver in developing a driving behavior to obtain optimum overall vehicle fuel economy without significantly compromising vehicle powertrain performance.

2. Background Discussion

Hybrid electric vehicle powertrains having both an electric power source and a mechanical power source provide improved engine fuel efficiency and reduced undesirable exhaust gas emissions in comparison to a conventional vehicle powertrain. One example of a hybrid electric vehicle powertrain is described in U.S. Pat. Nos. 6,907,325; 6,994,360; and 7,013,213, which are assigned to the assignee of the present invention.

The hybrid electric vehicle powertrain disclosed in these patents, sometimes referred to as a full-hybrid powertrain, has a power-split power flow path from each power source to vehicle traction wheels. The power developed by the electric power source is integrated with power developed by the mechanical power source using a planetary gearset with separate elements of the gearset being drivably connected to an internal combustion engine, a generator and a motor. A vehicle control system is designed to optimize fuel economy, reduce undesirable engine exhaust gas emissions and manage power delivered to traction wheels without compromising vehicle performance. The powertrain emulates electronically the performance characteristics of well-known continuously variable vehicle transmissions.

The powertrain has a potential for improving fuel economy by enabling the engine to operate in its most efficient region independently of vehicle speed. The achievement of high fuel economy, however, depends to a large extent upon driver behavior, which plays a significant role in full utilization of the advantages of a hybrid electric vehicle powertrain.

Although a power-split hybrid powertrain will be disclosed, various other hybrid electric vehicle powertrain configurations and control technologies could be used in practicing the strategy of the present invention. The best results are achieved by shaping and limiting the driver demand for power to improve overall fuel economy under normal driving conditions without reducing the vehicle's performance under both heavy load conditions and heavy acceleration driver demand.

Hybrid electric vehicles usually are classified into three types; i.e., series hybrid systems, parallel hybrid systems, and power-split hybrid systems. A power-split hybrid system, which is capable of incorporating the present invention, provides characteristics of both a series system and a parallel system. A power-split hybrid system uses a planetary gearset to connect an internal combustion engine, a generator and a motor, although other engines, such as a fuel cell power plant also could be used.

A power-split hybrid electric vehicle powertrain provides the driver with an ability to use an electric drive mode using a traction motor, wherein traction power is applied using power of a high voltage battery only. It also can operate in a hybrid drive mode using reaction torque of the generator to control engine speed as traction power is delivered to the wheels from both the engine and the motor. In this mode of operation, the engine is operated at its most efficient region independently of vehicle speed. A high voltage battery acts either as an energy storage medium, or as an additional power source for the motor. The generator and the motor, together with the engine in a power-split hybrid electric vehicle, require a highly coordinated vehicle control system with control algorithms residing in a vehicle controller to perform a blending of torque, speed and power of the two power sources.

SUMMARY OF AN EMBODIMENT OF THE INVENTION

An embodiment of the present invention comprises an intelligent control system and method capable of achieving a fuel economy improvement that automatically identifies driver style, intentions and preferences. It provides guidance for selecting an optimal driving strategy that results in optimum fuel economy. An advisory system of the disclosed embodiment of the invention may consist of two fuzzy logic controllers that determine maximum driver demand corresponding to a desired fuel economy level under current operating conditions. In the alternative, a proportional-integral (PI) logic type controller could be used, although fuzzy logic controllers will be described hereinafter.

The output of the controller is a dynamically calculated upper limit for driver demand that is continually conveyed to the driver. The system serves as an automatic advisor for guiding the driver to a performance condition that maximizes fuel economy without significantly reducing vehicle speed. The logic control system intelligently monitors and identifies a driver's driving pattern and provides guidance for selecting the optimal driving strategy.

The system of the disclosed embodiment of the invention includes two fuzzy logic controllers that determine the maximum driver demand (accelerator and brake pedal positions) corresponding to a desired fuel economy level, current engine operating conditions and vehicle speed. The output of the controller dynamically calculates an upper bound for the driver demand that can be continually conveyed to the driver through haptic or force feedback mechanisms. In this manner, the controller provides guidance to the driver that, if followed, can potentially maximize the fuel economy for a given operating condition and vehicle speed. This results in a shaping and a limiting of driver demand to improve overall fuel economy under normal driving conditions without reducing the vehicle's performance under heavy load or heavy accelerator driver demand.

The output of the system of the disclosed embodiment of the invention may be a sensory signal for guiding a change in driver behavior. Provision may be made for changing the intensity of the sensory signal.

PARTICULAR DESCRIPTION OF THE DISCLOSED EMBODIMENT OF THE INVENTION

Figure 1:
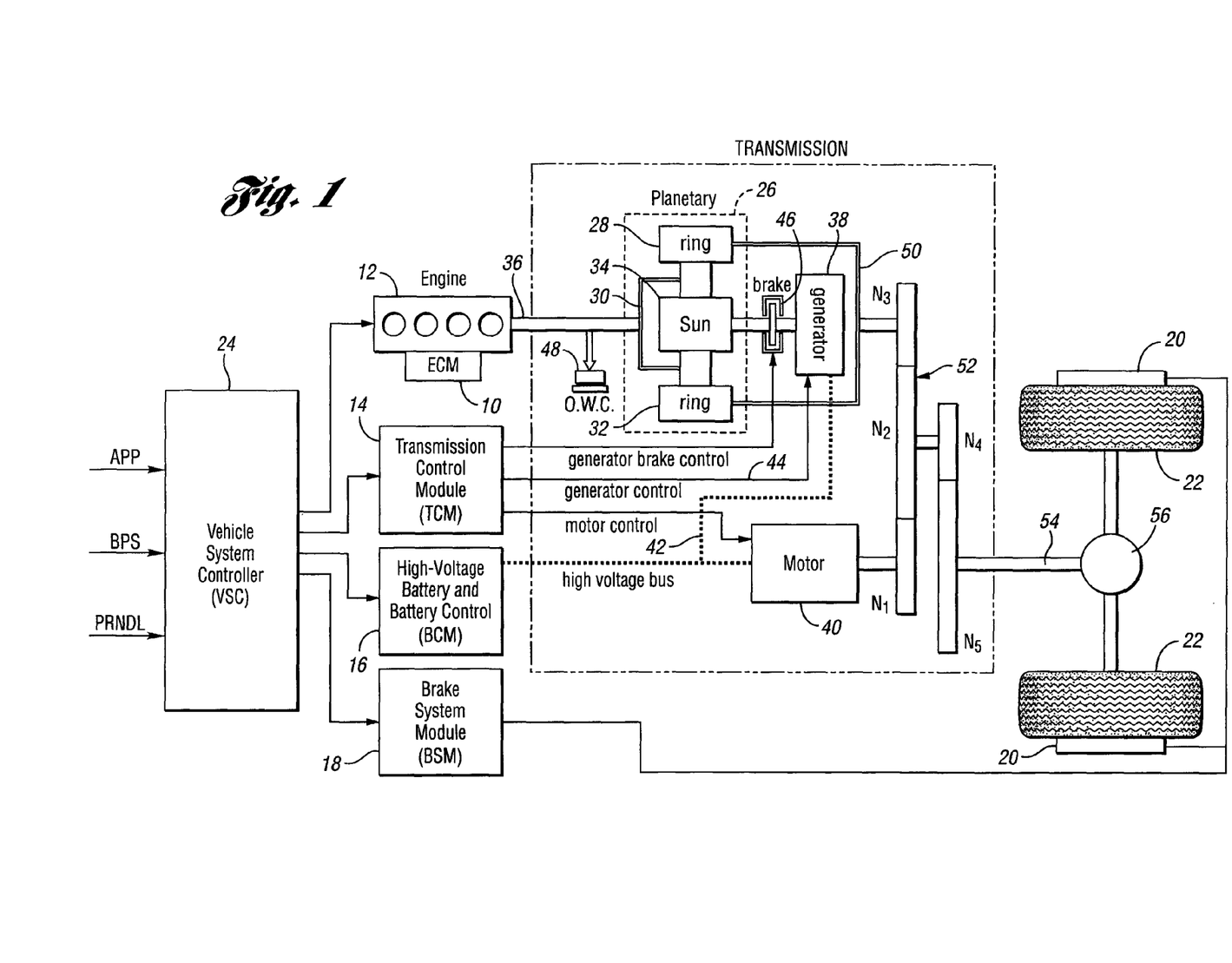
FIG. 1 is a schematic illustration of a power-split hybrid electric vehicle powertrain capable of embodying the invention.

FIG. 1 illustrates a power-split hybrid electric vehicle configuration and its control system, as well as the subsystems. The control system uses an engine controller (ECM), as shown at 10, for controlling engine 12, a transmission controller (TCM) as shown at 14, a high-voltage battery controller (BCM), as shown at 16, and a regenerative braking system module (BSM), as shown at 18. The brake system module controls vehicle traction wheel brakes 20. The vehicle traction wheels are shown at 22.

A supervisory vehicle system controller 24 provides vehicle system coordination and control as it communicates with the subsystem controllers, as illustrated in FIG. 1. It manages and coordinates driveline functions to satisfy the driver's request for power and balances the energy flow between the engine and the battery, motor and generator subsystem.

The vehicle system controller is responsible for optimally managing energy flow through the transmission to provide the hybrid operating mode functions, such as electric drive, regenerative braking, engine start-up, hybrid drive, and high-voltage battery power maintenance.

In FIG. 1, the transmission comprises a planetary gearset 26, which comprises a ring gear 28, a sun gear 30 and a ring gear 32. Planetary pinions carried by carrier 34 are drivably engaged with the ring gear 28 of the sun gear 30. The carrier is connected directly to an engine crankshaft 36.

An electric generator 38 is drivably coupled to sun gear 30. The generator and a high-voltage traction motor 40, together with control module 16, are electrically coupled by a high voltage bus, as shown at 42.

The generator 38 is under the control of transmission control module 14, as shown at 44. If desired, a generator brake 46 can be applied to anchor the generator and sun gear to establish a fully mechanical power flow path from the engine to the traction wheels through the planetary gearset 26. An overrunning coupling 48 may be provided for braking the crankshaft 36 and carrier 34 to provide reaction torque if a generator drive mode is desired, wherein the generator acts as a motor.

The ring gear 28 is mechanically coupled, as shown at 50, to torque transfer gears 52, which transfer power to the traction wheels through driveshaft 54 and differential and axle assembly 56.

Electric motor 40 is mechanically coupled to the torque transfer gears 52 for delivering motor power to the traction wheels, which complements engine power during forward drive. During reverse drive, the motor 40 can operate in a reverse direction with the engine off. Overrunning coupling 48 prevents counter-rotation of the crankshaft 36 at this time.

A request by the driver for traction power at the traction wheels 22 is conveyed to the vehicle system controller through an accelerator pedal and a brake pedal. During operation of the hybrid electric vehicle, the driver traction request level and its profile or shape affect the fuel efficiency more in the case of a hybrid electric vehicle powertrain as compared to a conventional vehicle powertrain. The reason for this greater effect on fuel economy in a hybrid electric vehicle is that there is more than one energy source in a hybrid electric vehicle. Furthermore, there are different operating modes based on the driver traction request.

The different operating modes of a hybrid electric vehicle that can be selected may or may not be optimal for achieving optimum fuel efficiency. For example, during acceleration events, based on a higher traction force request, the vehicle system controller in a hybrid electric vehicle may decide to enter into a hybrid mode of operation, whereas if the driver traction request were slightly lower, it may have selected the electric mode of operation. Similarly, even in the case of a hybrid mode of operation, based on a higher traction request, the vehicle system controller may command the engine to operate at a point that meets the driver's request, but results in lower fuel efficiency as compared to when the driver traction request is lower. Also, during braking events, the amount of brake pedal depression and the rate at which it is depressed may reduce the amount of regenerative energy captured during the event. This ultimately will affect the fuel efficiency in a negative manner.

The intelligent advisory controller of the present invention can determine an upper bound for both the accelerator pedal position and the brake pedal position. It can be used to convey to the driver an optimum position for accelerator pedal and brake pedal for a vehicle driving condition to maximize fuel efficiency.

These considerations are implemented in the rule-based fuzzy logic controller that forms the advisory system for improving fuel efficiency in a hybrid electric vehicle.

Figure 2:
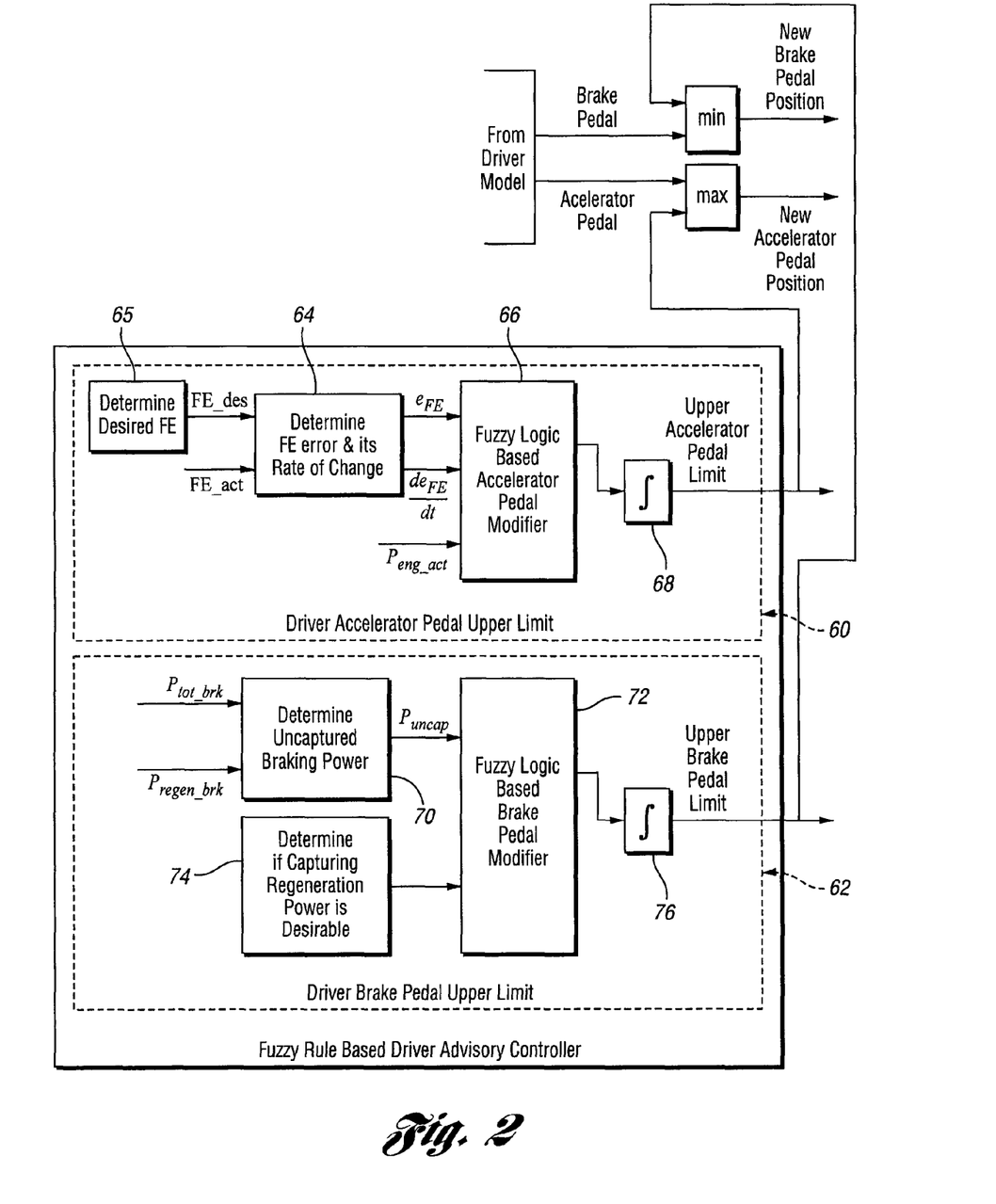
FIG. 2 is a schematic block diagram of a fuzzy logic rule-based driver advisory control system for optimizing fuel efficiency in a hybrid electric vehicle.

FIG. 2 shows a block diagram of the rule-based driver advisory control system for optimizing fuel efficiency in a hybrid electric vehicle.

The driver advisory system seen in FIG. 2 is composed of two fuzzy logic controllers, schematically illustrated at 60 and 62 in FIG. 2. Controller 60 determines driver accelerator pedal upper limit and controller 62 determines driver brake pedal upper limit. The controller 60, which determines driver accelerator pedal limit, uses desired fuel economy (FE_des), seen at 65, and actual instantaneous fuel economy (FE_act) to determine fuel economy error ($e_{FE}$) and rate of change of fuel economy error ($de_{FE/dt}$). A rule-base, combined with fuzzy reasoning, then determines an accelerator pedal modifier based on fuel economy error, rate of change of fuel economy error and actual engine power (Peng_act).

The control block where the desired fuel economy and the instantaneous fuel economy are used in determining fuel economy error is shown at 64. The value for desired fuel economy is determined at control block 65 in FIG. 2.

The rate of change of fuel economy error, also determined at action block 64, is distributed to fuzzy logic based accelerator pedal modifier control block 66, which also receives actual engine power (Peng_act). Control block 66 also receives from block 64 a rate of change of fuel economy error ($de_{FE/dt}$). A rule base in action block 66, combined with fuzzy reasoning, then determines an accelerator pedal modifier based on fuel economy error, rate of change of fuel economy error and actual engine power ($P_{eng\_act}$). An output ($\Delta A$) from the controller 66 is integrated at 68, and appropriate saturation limits are imposed to determine the upper limit for accelerator pedal ($A_{U\_LIM}$). This recommended upper limit pedal position, if followed by the driver, provides an ability for the driver to improve fuel economy by modifying the actual accelerator pedal position. Similarly, the controller 62, which determines driver brake power upper limit, uses total braking power ($P_{tot\_brk}$), as shown at 70, and total regenerative braking power ($P_{regen\_brk}$), as shown at 70, to determine the uncaptured braking power ($P_{UNCAP}$). Again, a rule-based fuzzy logic controller, shown at 72, determines a brake pedal modifier based on uncaptured braking power and a desired regenerative braking flag (flag_regen_des). The flag, which is set at 74, is an indication that capturing regenerative energy is desired under current vehicle driving conditions.

Finally, the output ($\Delta B$) of this fuzzy logic controller is integrated at 76, with appropriate saturation limits, to determine the upper limit for the brake pedal ($B_{U\_LIM}$). This upper limit for brake pedal position, if followed by the driver, enables the driver to improve fuel economy by modifying actual brake pedal position.

The driver advisory system improves overall vehicle fuel efficiency by providing a mechanism for the driver to change his or her driving behavior. This controller utilizes the human control knowledge and experience to intuitively construct an intelligent controller so that the resulting controller will emulate the desired control behavior to a certain extent.

To design an effective fuzzy rule-based driver advisory controller, input variables, output variables and input and output fuzzy sets need to be defined. It is important to define the desired input variables and output variables for the fuzzy logic controllers that determine the driver accelerator pedal upper limit and the driver brake pedal upper limit. Fuel economy error, rate of change of fuel economy error and actual engine power are used as the inputs for the driver accelerator pedal modifier as these inputs, very simply and explicitly, convey the effect on overall fuel efficiency in a hybrid electric vehicle. Similarly, uncaptured braking power and a desired regenerative braking flag (flag_regen_des) are used as inputs for the driver brake pedal modifier as these inputs capture the fact that the vehicle may be using friction brakes, which may result in reducing overall vehicle fuel economy.

Trapezoidal membership functions representing the negative, zero and positive states were chosen for the inputs and the outputs of the fuzzy accelerator pedal modifier controller. Similarly, trapezoidal membership functions representing the low and high states can be used for the inputs and outputs of the fuzzy brake pedal modifier controller. The fuzzy rules for two controllers are described in FIGS. 3 and 3a.

Figure 3:
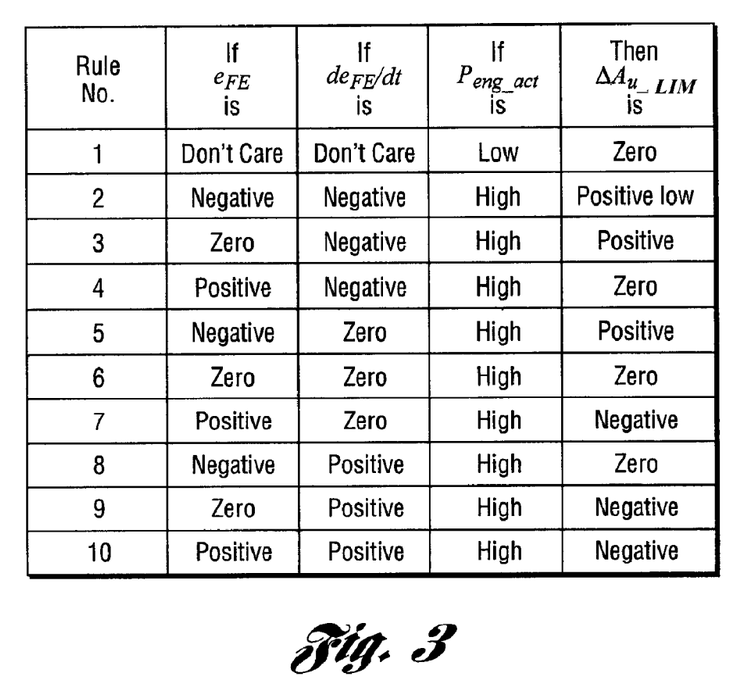
FIG. 3 is a table that contains fuzzy logic rules for determining an accelerator pedal modifier.
Figure 3A:
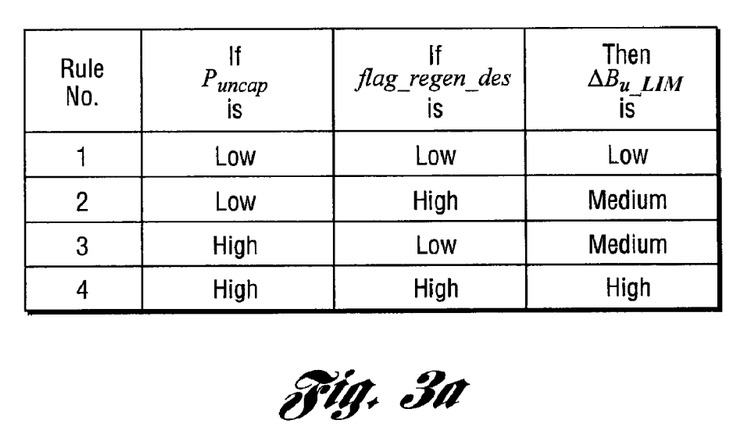
FIG. 3a is a table that includes fuzzy logic rules for a brake pedal modifier.

The rules in FIG. 3 exemplify different hybrid electric vehicle acceleration or deceleration conditions defined by the rule antecedents and the corresponding recommended changes of the upper limit of accelerator pedal as consequents. The changes in the upper limit are listed in the right-hand column of FIG. 3. Similarly, the fuzzy rules in FIG. 3a can distinguish between different hybrid electric vehicle powertrain braking conditions to improve fuel economy and to make decisions regarding the current and future states of modifiers for brake pedal position.

Several iterations of simulations using power-split hybrid electric vehicle powertrain environments can be used appropriately and manually to calibrate antecedents and consequent membership functions of the fuzzy rules sets. Once the calibration of antecedent and consequent membership functions are complete, simulations can be performed for a prescribed drive cycle to determine the effectiveness of a proposed controller.

The driver advisory system alerts the driver when his or her driving style results in decreasing fuel economy. Recommended actions regarding the accelerator and brake pedals, if implemented, guide the driver in accomplishing an instantaneous fuel economy (FE_act) that is maximally close to the desired fuel economy (FE_des) for a specific vehicle speed.

The advisory system operates as a feedback control assuming that the recommended control actions $\Delta A$ and $\Delta B$ calculated by both fuzzy controllers 60 and 62 are implemented by the driver. In reality, however, there is no guarantee that the driver would follow proposed strategies. The reason for that can be objective (current driving conditions require more power from the vehicle, i.e., bypassing another vehicle, merging a highway, etc.) or subjective (the driver's priority is not fuel economy). Therefore, the estimation of the driver's intentions is relevant to acceptance of the advisory system.

Short term objective rejection of the recommendation of the advisory system is identified as follows based on the filtered difference $\delta_k$ between the actual $\alpha_k$ and the recommended $A_k$ accelerator pedal position:

$$\delta_{k+1} = \delta_k + \alpha(\alpha_k - A_k - \delta_k)$$

In this equation, parameter $\delta_k$ represents a measure of compatibility between the driver's actions and the system. A high positive value $\delta_k$ corresponds to a consistent rejection, and a negative value reflects acceptance of system recommendations. It is reset to $\delta_0=0$) when $\alpha_k=A_k$ and is continuously updated. Consistent short term rejection of recommended pedal position results in an increasing value of $\delta_k$ that is used to adapt the intensity of a signal from a haptic device, such as the vibration of a haptic pedal motor vibrator. If the default intensity of the vibration is $E_0$, then it is adjusted to the short term compatibility between $\alpha_k$ and $A_k$ according to the law:

$$E_{k+1} = \min(E_0, E_k \exp(-\delta_k t)),$$

where t is a tuning parameter.

For increasing positive values of compatibility measure $\delta_k$, the intensity of vibration rapidly decreases. It remains at its default value for nonpositive $\delta_k$, in the case where the driver accepts system recommendations.

A validated simulation environment consisting of the vehicle model, together with the subsystem models of the various hybrid specific systems, may be used for the development of a fuzzy rule-based driver advisory controller, which is part of the vehicle system controller functionality. This hybrid electric vehicle simulation architecture is shown in FIG. 2.

The power-split Hybrid electric vehicle simulation environment is a complete vehicle model that consists of three major system blocks, driver and environmental inputs 78, system controllers 80, and a complete power-split vehicle dynamic model 82. The driver portion of the driver and environment inputs block 78 has the typical driver inputs such as the gear lever position PRNDL, the accelerator pedal position APP, and the brake pedal position BPS. These signals are seen in FIG. 1. This block can be configured to follow a wide selection of standard drive cycle traces representing urban, highway or even a custom drive cycle. The environment portion of the model was configured for such conditions as ambient and vehicle cabin temperatures, barometric pressure, road grade, and road surface friction coefficient. The complete power-split vehicle dynamics model at 82 contains the models for the physical subsystems that make up the traditional vehicle components, as well as the power-split hybrid powertrain specific components. The models that reside in this system are the brake system, driveline, planetary gearset, engine, HV battery and electric machines. Other characteristics of the vehicle that may be modeled include the drag coefficient, rolling resistance of the tires, and the vehicle weight.

Figure 5:
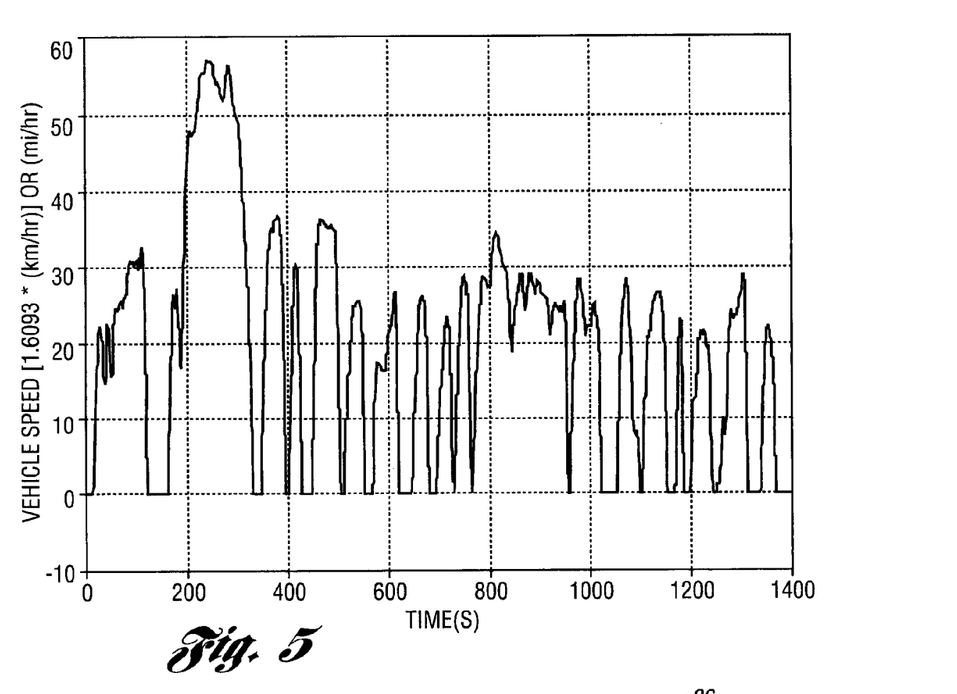
FIG. 5 is a plot of vehicle speed versus time using a known federal test procedure (USFTP-72 cycle), also called Urban Dynamometer Driving Schedule or LA-4 cycle, which records driver behavior and its impact on fuel economy.

The system controllers block 80 consists of the vehicle system controller 24, engine controller 10, transaxle controller 14, battery controller 16, and brake system controller 18. As described previously, the driver and environmental inputs block 78 determines typical driver inputs, such as the accelerator and brake pedal positions for a given driver cycle. Since this block consists of desired drive cycle traces, it may be configured to follow the U.S. FTP-72 (Federal Test Procedure) cycle, also called Urban Dynamometer Driving Schedule (UDDS) or LA-4 cycle, such that driver behavior and its impact on fuel economy can be studied. This FTP-72 drive cycle is shown in FIG. 5. This drive cycle may be selected, as indicated, to obtain a baseline of fuel economy for a power-split hybrid electric vehicle using a conventional controller.

Since driver behavior needs to be modeled, a PID controller capable of providing accelerator and brake pedal inputs based on the desired and actual vehicle speed may be used. Using a driver model, the proportional and integral gains can easily be used to define driver's aggressiveness.

Figure 4:
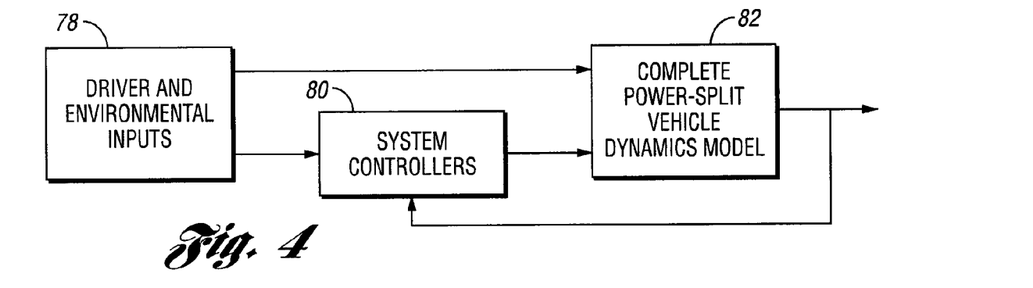
FIG. 4 is a schematic block diagram of a power-split hybrid electric vehicle controller.

Low proportional and integral gains will indicate a very soft driver; i.e., a driver who depresses the accelerator or brake pedals very slowly and smoothly. In other words, a very soft driver is one who is a very informed and conscientious driver who tries to improve overall vehicle fuel efficiency. On the other hand, high proportional and integral gains will indicate a very aggressive driver; i.e., a driver who depresses the accelerator pedal or brake pedal very fast and harshly. Therefore, different drivers, varying from very soft to very aggressive, can be configured by appropriately choosing these proportional and integral gains. FIG. 4 shows the model of the driver used in the driver and environmental inputs block 78.

Figure 6:
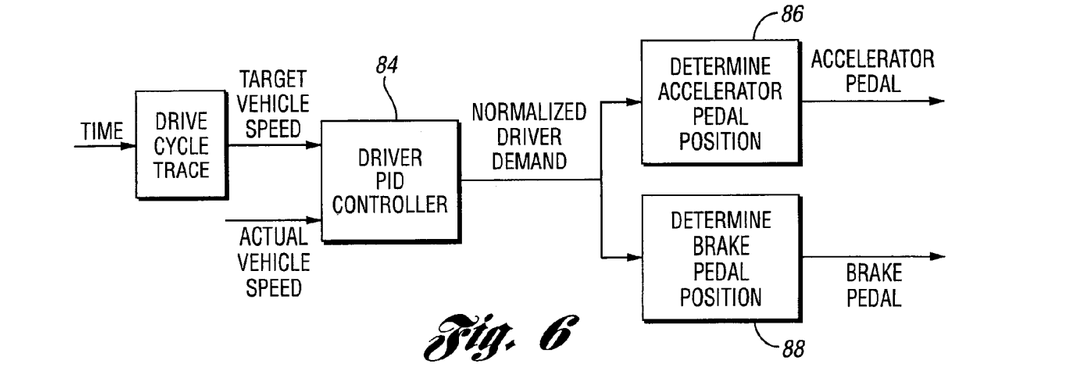
FIG. 6 is a schematic block diagram showing a driver model for developing driver inputs to the control system of the invention.

The PID controller, shown at 84 in FIG. 6, receives actual and target vehicle speed and develops a normalized driver demand. This information is used at action blocks 86 and 88 to determine brake pedal and accelerator pedal positions.

Figure 7:
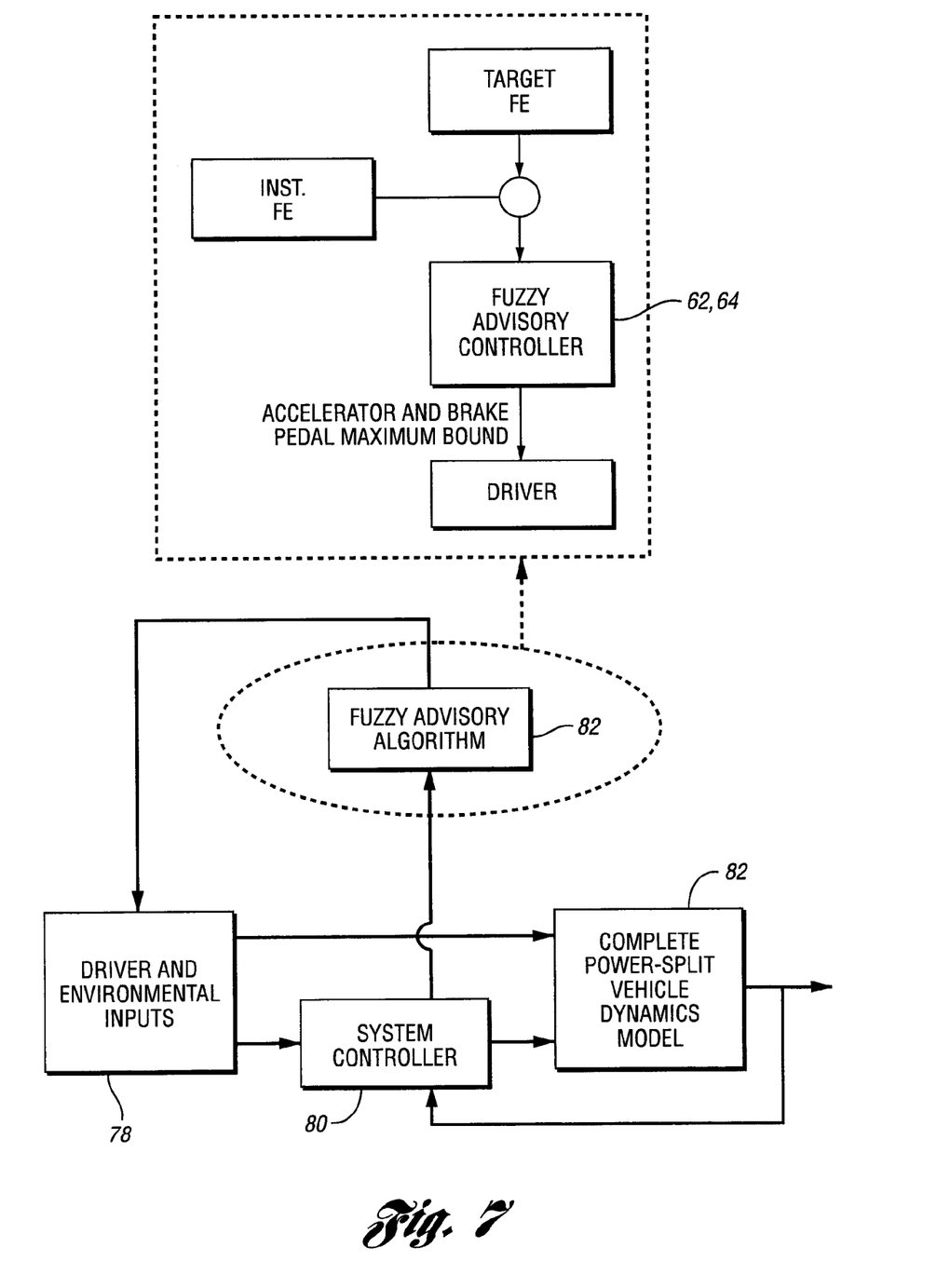
FIG. 7 is a schematic block diagram showing a fuzzy logic driver advisory system.

The fuzzy rule-based driver advisory system of FIGS. 2 and 7, including fuzzy advisory algorithms 85, is embedded in the system controllers block 80. It includes the two fuzzy logic controllers 60 and 62 that continuously calculate the recommended ranges of the accelerator and brake pedal positions and that communicate that information to the driver and environmental inputs shown at 78 in FIGS. 2 and 7. These recommended ranges are applied to constrain the accelerator and brake pedal inputs generated by the PID controller that simulates the driver behavior.

FIG. 6 shows the overview of the simulation of the advisory system description and its interaction with the driver and environmental inputs and system controllers blocks 78 and 80, respectively.

Figure 8:
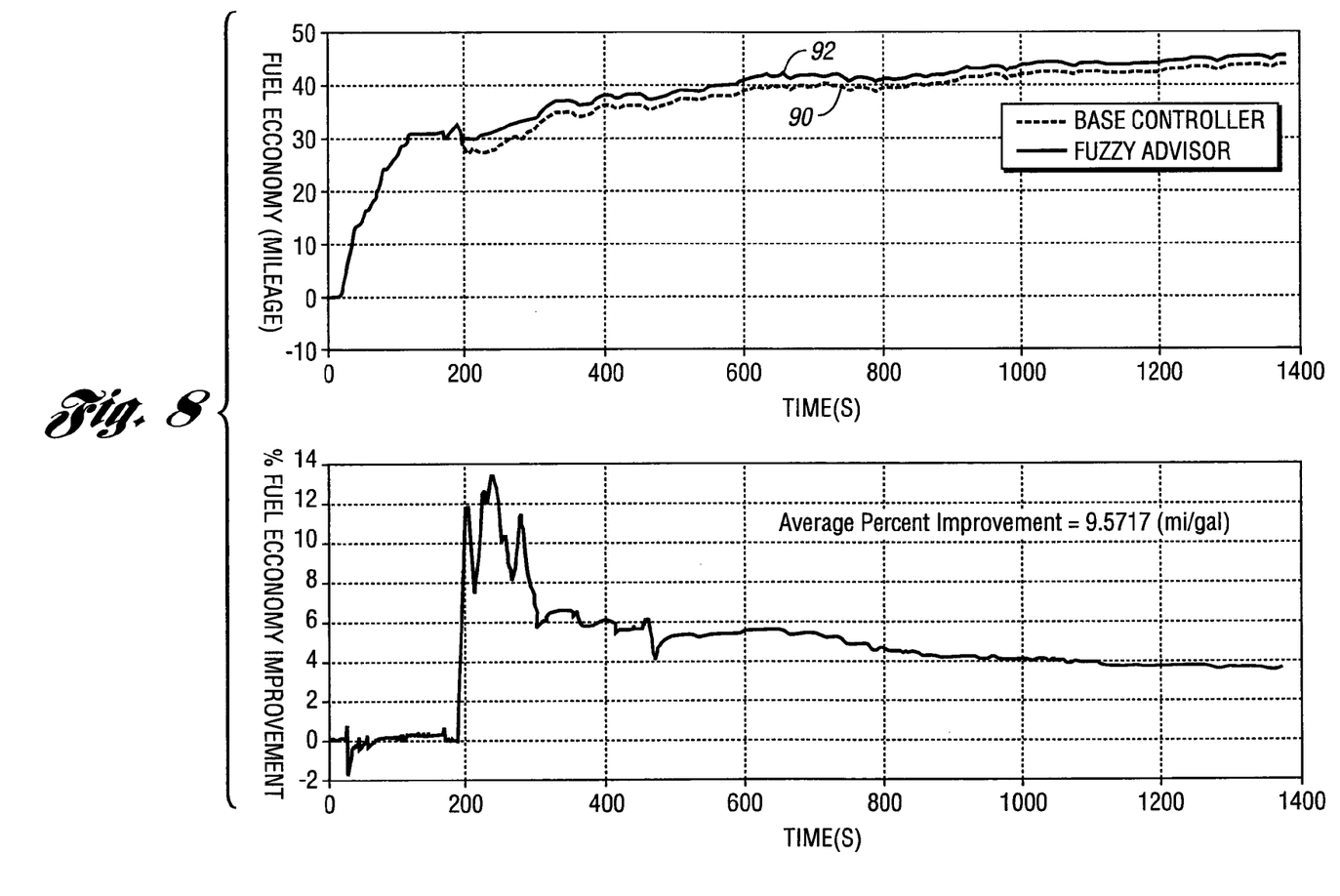
FIG. 8 shows time plots that compare fuel economy results of a base controller and a controller using the fuzzy logic advisor of the invention.

The FTP-72 test cycle described by FIG. 5 validate fuel economy improvements made possible using the controller strategy of the invention. A standard drive cycle is simulated in FIG. 5 in a study of the urban fuel economy of vehicles. Simulations may be performed with different drivers with and without the proposed controller to determine the fuel economy improvement. To determine if fuel economy improvements can be achieved even for a very soft driver, simulations with and without the fuzzy rule-based driver advisory control system may be performed using settings for a very soft driver. Typical fuel economy results are shown in FIG. 8. In FIG. 8, the overall fuel economy during a typical test drive cycle with a conventional (base) controller is shown by trace 90. A corresponding trace using the controller of the invention is shown at 92. The average percentage improvement is separately plotted in FIG. 8. It is clear from FIG. 8 that even with very soft driver settings there may be about a 3.5% average fuel economy improvement when the feedback from the fuzzy rule-based driver advisor is utilized.

Figure 9:
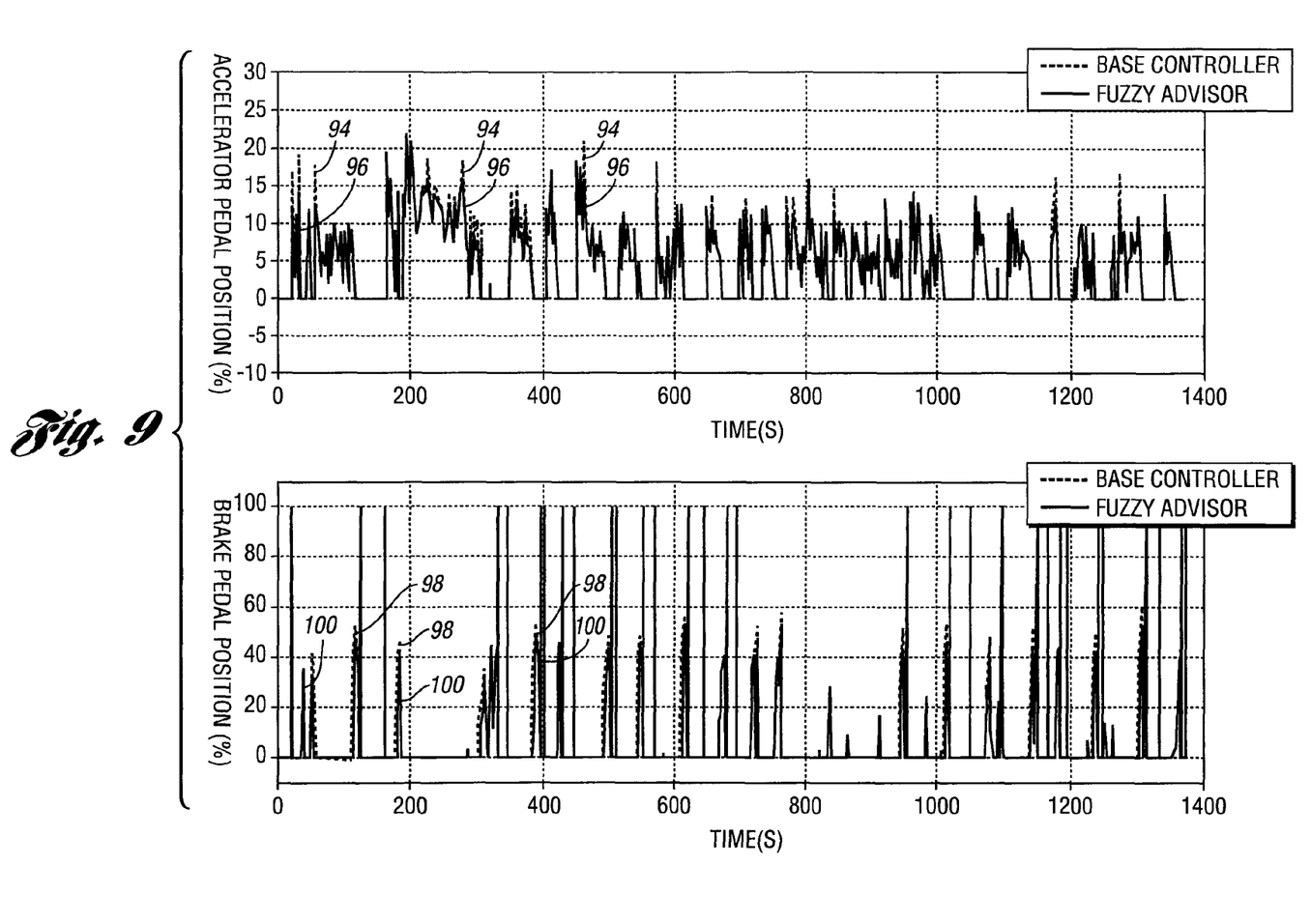
FIG. 9 shows time plots for accelerator pedal position and brake pedal position in a system that includes the present invention and for a system using a base controller.

FIG. 9 shows the corresponding accelerator and brake pedal positions with and without the fuzzy rule-based driver advisor controller. The accelerator position time trace without the controller of the invention is shown at 94. The corresponding trace with a conventional (base) controller is shown at 96. It is clear from FIG. 9 that the accelerator pedal position is appropriately reduced to achieve appropriate fuel economy improvement without significantly sacrificing drivability.

It is also clear from FIG. 9 that the brake pedal position is appropriately reduced (since the driver was a very soft driver, the reduction in brake pedal position is minimal) to achieve appropriate fuel economy improvement without affecting the vehicle braking. In FIG. 9, the time trace obtained using a conventional (base) controller is shown at 98 and the corresponding trace using the controller of the invention is shown at 100.

Figure 10:
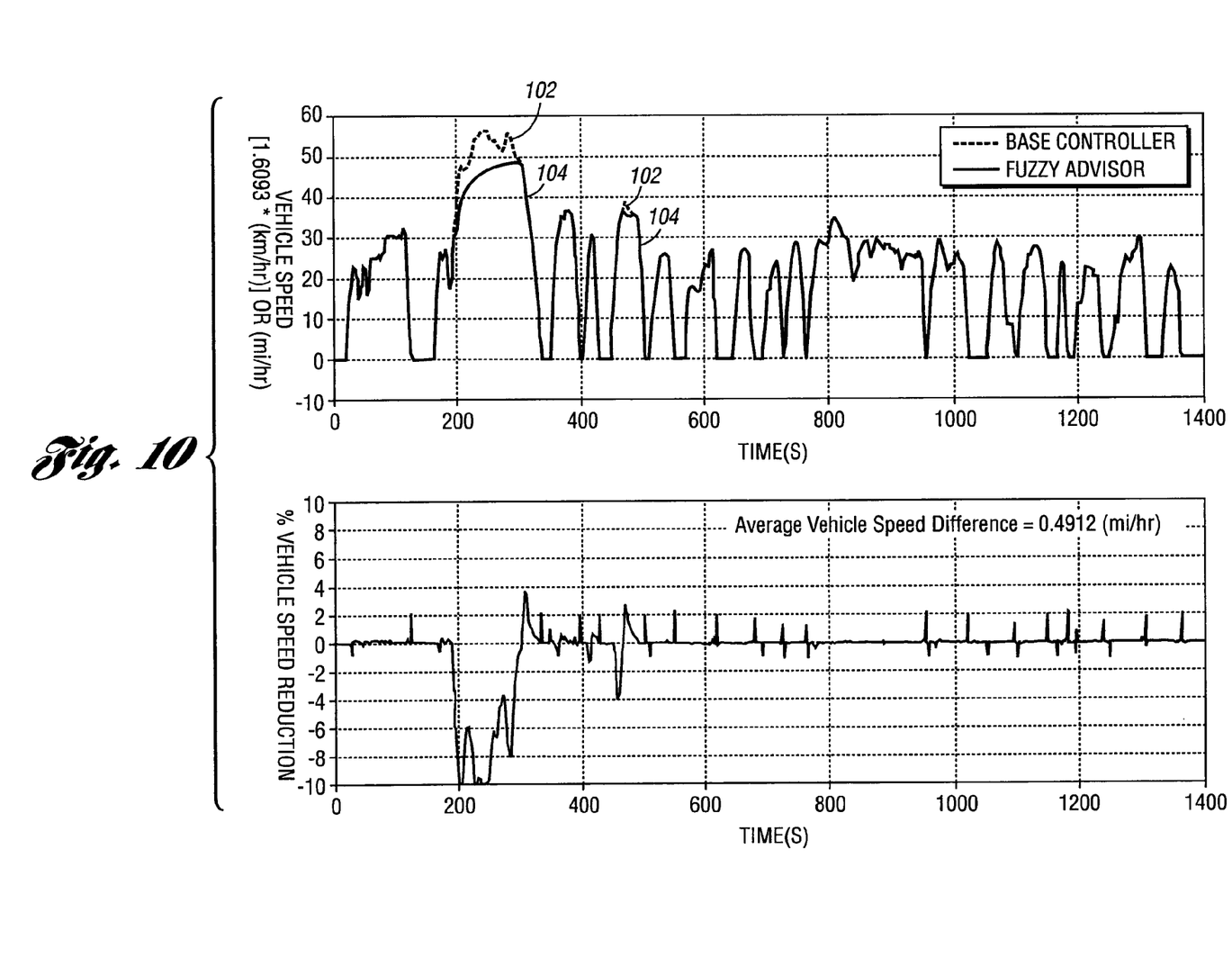
FIG. 10 shows time plots of a vehicle speed profile comparison of a hybrid electric vehicle powertrain incorporating the invention and a hybrid electric vehicle powertrain using a base controller.

FIG. 10 indicates the difference in the resulting vehicle speed with and without the fuzzy rule-based driver advisor controller. In FIG. 10, a vehicle speed time trace for a given drive cycle using a conventional (base) controller is shown at 102 and a corresponding time trace using the controller of the invention is shown at 104. The lower portion of FIG. 10 shows that the vehicle speed reduction due to brake pedal position changes using the strategy of the invention is small during the drive cycle.

The drive cycle indicated in FIGS. 9 and 10 emulate, but does not exactly follow, the drive cycle shown in FIG. 5.

The average reduction in vehicle speed for the whole drive cycle may be around 0.79 km/hr (0.4912 ml/hr), which is equivalent to an average speed reduction of about 2.49%. The fuel economy improvement, about 3.5% in this case, outweighs this reduction in vehicle speed when the fuzzy rule-based driver advisor controller of the invention is used.

Even a very informed and conscientious driver with the goal of improving fuel economy may not achieve optimal fuel efficiency without utilizing some form of feedback mechanism. The use of the rule-based driver advisor control system of the invention can guide such a driver to improve the fuel economy of the vehicle for a given drive cycle. The simulations demonstrate that the rule-based driver advisory system with a small rule set can provide a feedback mechanism that has a substantial effect on fuel economy. This approach provides a cost effective way to improve fuel economy of a hybrid electric vehicle.

The rule-based driver advisory controller of the invention can be used in conventional vehicles as well.

Although an embodiment of the invention has been disclosed, it will be apparent to persons skilled in the art that modifications may be made without departing from the scope of the invention. All such modifications and improvements thereof are intended to be defined within the scope of the following claims.

What is claimed is:

1. A driver advisory system comprising:
   a vehicle system controller having a fuzzy logic controller with an instantaneous fuel economy input, a desired fuel economy input and a driver advisory output;
   the fuzzy logic controller configured to develop an accelerator pedal position modifier based on a fuel economy error which is a difference between the desired and instantaneous fuel economy, a rate of change of the fuel economy error, and an actual engine power.

2. The driver advisory system set forth in claim 1, wherein the fuzzy logic controller has a total vehicle braking input and a regenerative braking input, which determine an uncaptured vehicle braking value, the fuzzy logic controller being configured to develop a brake pedal position modifier based on the uncaptured braking value.

3. The driver advisory system set forth in claim 2, wherein the fuzzy logic controller is further configured to integrate the brake pedal position modifier in appropriate saturation limits to determine an upper brake pedal position limit for a given instantaneous operating condition.

4. The driver advisory system set forth in claim 1, wherein the fuzzy logic controller is further configured to integrate the accelerator pedal position modifier in appropriate saturation limits to determine an upper accelerator pedal position limit for a given instantaneous operating condition.

5. The driver advisory system set forth in claim 1, further comprising:
a haptic feedback mechanism forming a part of an accelerator pedal assembly for conveying to the driver an accelerator pedal position feedback sensory signal for guidance to maximize operating economy of the power source for given operating conditions, wherein the haptic feedback mechanism includes means for adjusting the intensity of the accelerator pedal position feedback sensory signal from a default intensity.

6. A driver advisory system for a vehicle powertrain having at least one power source, a vehicle driver controlled vehicle accelerator pedal assembly, a driver-controlled brake pedal assembly and a vehicle system controller;
a power transmission for delivering power to vehicle traction wheels;
the vehicle system controller being configured to control delivery of power from the power source to the traction wheels through the power transmission;
the vehicle system controller comprising an intelligent system to identify a current driving pattern for a vehicle driver and for guiding the driver in selecting an optimal driving pattern for current operating conditions and vehicle speed, wherein the vehicle system controller includes a fuzzy logic controller with an instantaneous fuel economy input, a desired fuel economy input and a driver advisory output;
the fuzzy logic controller being configured to develop an accelerator pedal position modifier based on a fuel economy error which is a difference between the desired and instantaneous fuel economy, a rate of change of the fuel economy error, and an actual engine power; and
a first haptic feedback system forming a part of the accelerator pedal assembly for conveying to the driver an acceleration pedal position feedback sensory signal for guidance to maximize operating efficiency of the power source for given operating conditions; and
a second haptic feedback system forming a part of the brake pedal assembly to convey to the driver a brake pedal position feedback sensory signal for guidance to maximize brake operating efficiency for given operating conditions.

7. The system set forth in claim 6 wherein the powertrain has hybrid electric vehicle characteristics with an accelerator pedal controlled engine, an electric motor electrically coupled to a battery and an electric generator;
the power transmission having gearing, a first element of the gearing being mechanically connected to the engine, a second element of the gearing being mechanically connected to the generator, and a third element being drivably connected to the traction wheels;
the vehicle system controller coordinating power delivery through the gearing, whereby engine speed is determined by reaction torque acting on the generator.

8. The driver advisory system set forth in claim 6, wherein the second haptic feedback mechanism includes means for adjusting the intensity of the brake pedal position sensory signal from a default intensity.

9. A method for controlling a hybrid electric vehicle having a powertrain that includes an accelerator pedal controlled internal combustion engine power source and an electric power source that includes an electric motor, an electric generator, an electric battery, and a transmission delivering power to vehicle traction wheels from each power source;
the method comprising:
managing power flow from each power source through the transmission to selectively provide hybrid drive, mechanical drive using solely engine power, electric drive using solely power of the motor, regenerative braking, engine starting and battery power maintenance;
determining an optimum accelerator pedal position for possible operating conditions based upon desired fuel economy and actual instantaneous fuel economy;
determining a fuel economy error;
determining a rate of change of fuel economy error;
determining an accelerator pedal position modifier at a fuzzy logic controller based on fuel economy error, rate of change of fuel economy error and actual instantaneous engine power; and
integrating the accelerator pedal position modifier within appropriate saturation limits to determine an optimum accelerator pedal position for a driver demand for power for a given instantaneous operating condition, whereby the driver is provided with guidance to improve engine fuel combustion economy.

10. The method set forth in claim 9, wherein the provision of guidance to the driver to improve engine fuel combustion economy includes developing a haptic sensory signal for the driver to indicate when an accelerator pedal position deviates from an optimum position.

11. A method for controlling a hybrid electric vehicle having a powertrain that includes an accelerator pedal controlled internal combustion engine power source and an electric power source that includes an electric motor, an electric generator, an electric battery, and a transmission delivering power to vehicle traction wheels from each power source;
the method comprising:
managing power flow from each power source through the transmission to selectively provide hybrid drive, mechanical drive using solely engine power, electric drive using solely power of the motor, regenerative braking, engine starting and battery power maintenance;
determining an optimum brake pedal position using total braking power and total regenerative power to determine a brake pedal position modifier based on uncaptured braking power and upon whether a desired regenerative braking flag indicates that the capturing of regenerative energy is desired under current vehicle operating conditions; and
integrating the brake pedal position modifier in appropriate saturation limits to determine an optimum brake pedal position, whereby the driver is provided with guidance to improve engine fuel combustion economy by modifying actual brake pedal position to achieve optimum vehicle braking.

12. The method set forth in claim 11, wherein the provision of guidance to the driver to improve engine fuel combustion economy includes developing a haptic sensory signal for the driver to indicate when a brake pedal position deviates from an optimum position.

13. A driver advisory system for a vehicle powertrain having at least one power source, a vehicle driver-controlled vehicle accelerator pedal assembly, a driver-controlled friction brake pedal assembly and a vehicle system controller configured to control power distribution to vehicle traction wheels from the power source;
 a power transmission system for delivering power to the traction wheels;
 the vehicle system controller comprising an intelligent system for identifying a current driving pattern for a vehicle driver and for guiding the driver in selecting an optimal driving pattern for current operating conditions and vehicle speed, wherein the vehicle system controller includes a fuzzy logic controller with an instantaneous fuel economy input, a desired fuel economy input and a driver advisory output;
 the fuzzy logic controller being configured to develop an accelerator pedal position modifier based on a fuel economy error which is a difference between the desired and instantaneous fuel economy, a rate of change of the fuel economy error, and an actual engine power;
 means for calculating an upper limit for driver demand for power for given operating conditions; and
 a haptic feedback mechanism forming a part of the accelerator pedal assembly for conveying to the driver a feedback sensory signal for guidance to maximize operating economy of the power source for given operating conditions when the driver demand for power exceeds the upper limit.

14. The driver advisory system set forth in claim 13, wherein the fuzzy logic controller has a total vehicle braking input and a regenerative braking input, which determine an uncaptured vehicle braking value, the fuzzy logic controller being configured further to develop a brake pedal position modifier based on the uncaptured braking value.

15. The driver advisory system set forth in claim 14, wherein the fuzzy logic controller is further configured to integrate the brake pedal position modifier within appropriate saturation limits to determine an upper brake pedal position limit for a given instantaneous operating condition.

16. The driver advisory system set forth in claim 13, wherein the fuzzy logic controller is further configured to integrate the accelerator pedal position modifier in appropriate saturation limits to determine an upper accelerator pedal position limit for a given instantaneous operating condition.

17. The driver advisory system set forth in claim 13, wherein the haptic feedback mechanism includes means for adjusting the intensity of the accelerator pedal position feedback sensory signal from a default intensity.

18. A driver advisory system for a vehicle powertrain having at least one power source, a vehicle driver controlled vehicle accelerator pedal assembly, a driver-controlled brake pedal assembly and a vehicle system controller;
 a power transmission system for delivering power to vehicle traction wheels;
 the vehicle system controller being configured to control delivery of power from the power source to the traction wheels through the power transmission;
 the vehicle system controller comprising an intelligent system for identifying a current driving pattern for a vehicle driver and for guiding the driver in selecting an optimal driving pattern for current operating conditions and vehicle speed, wherein the vehicle system controller includes a fuzzy logic controller with an instantaneous fuel economy input, a desired fuel economy input and a driver advisory output;
 the fuzzy logic controller being configured to develop an accelerator pedal position modifier based on a fuel economy error which is a difference between the desired and instantaneous fuel economy, a rate of change of the fuel economy error, and an actual engine power;
 a means for calculating an upper limit for driver demand for power for current operating conditions;
 a first haptic feedback system forming a part of the accelerator pedal assembly for conveying to the driver an acceleration pedal position feedback sensory signal for guidance to maximize operating efficiency of the power source for given operating conditions when the driver demand for power exceeds the upper limit; and
 a second haptic feedback system forming a part of the brake pedal assembly for conveying to the driver a brake pedal position feedback sensory signal for guidance to maximize powertrain operating efficiency for given operating conditions.

19. The system set forth in claim 18 wherein the powertrain has hybrid electric vehicle characteristics with an accelerator pedal controlled engine, an electric motor electrically coupled to a battery and an electric generator;
 the transmission having gearing, a first element of the gearing bearing mechanically connected to the engine, a second element of the gearing being mechanically connected to the generator, and a third element being drivably connected to the traction wheels;
 the vehicle system controller coordinating power delivery through the gearing, whereby engine speed is determined by reaction torque acting on the generator.

20. The driver advisory system set forth in claim 18, wherein the second haptic feedback mechanism includes means for adjusting the intensity of the brake pedal position sensory signal from a default intensity.

21. A method for controlling a hybrid electric vehicle having a powertrain that includes an accelerator pedal controlled internal combustion engine power source and an electric power source that includes an electric motor, an electric generator, an electric battery, and a transmission delivering power to vehicle traction wheels from each power source;
 the method comprising:
 managing power flow from each power source through the transmission to selectively provide hybrid drive, mechanical drive using solely engine power, electric drive using solely power of the motor, regenerative braking, engine starting and battery power maintenance;
 determining an optimum accelerator pedal position for possible operating conditions based upon desired fuel economy and actual instantaneous fuel economy;
 determining a fuel economy error;
 determining a rate of change of fuel economy error;
 determining an accelerator pedal position modifier at a fuzzy logic controller based on fuel economy error, rate of change of fuel economy error and actual instantaneous engine power; and
 integrating the accelerator pedal position modifier within appropriate saturation limits to determine an accelerator pedal upper position limit for a driver demand for power for a given instantaneous operating condition, whereby the driver is provided with guidance to improve engine fuel combustion economy when the accelerator pedal upper limit is exceeded.

22. The method set forth in claim 21, wherein the provision of guidance to the driver to improve engine fuel combustion economy includes providing a haptic sensory signal to the driver to indicate when an accelerator pedal position deviates from an optimum position.

23. A method for controlling a hybrid electric vehicle having a powertrain that includes an accelerator pedal controlled internal combustion engine power source and an electric power source that includes an electric motor, an electric generator, an electric battery, and a transmission delivering power to vehicle traction wheels from each power source;

the method comprising:

managing power flow from each power source through the transmission to selectively provide hybrid drive, mechanical drive using solely engine power, electric drive using solely power of the motor, regenerative braking, engine starting and battery power maintenance;

determining an optimum brake pedal position using total braking power and total regenerative power to determine a brake pedal position modifier based on uncaptured braking power and upon whether a desired regenerative braking flag indicates that the capturing of regenerative energy is desired under current vehicle operating conditions; and integrating the brake pedal position modifier in appropriate saturation limits to determine an upper limit for brake pedal position, whereby the driver is provided with guidance to improve powertrain operating efficiency by modifying actual brake pedal position when the brake pedal position upper limit is exceeded.

24. The method set forth in claim 23, wherein the provision of guidance to the driver to improve engine fuel combustion economy includes developing a haptic sensory signal to the driver to indicate when a brake pedal position deviates from an optimum position.

25. A method for controlling a hybrid electric vehicle having a powertrain that includes an accelerator pedal controlled internal combustion engine power source and an electric power source that includes an electric motor, an electric generator, an electric battery, and a transmission delivering power to vehicle traction wheels from each power source, comprising:

managing power flow from each power source through the transmission to selectively provide hybrid drive, mechanical drive using solely engine power, electric drive using solely power of the motor, regenerative braking, engine starting and battery power maintenance;

determining an optimum brake pedal position at a fuzzy logic controller using total braking power and total regenerative power to determine a brake pedal position modifier based on uncaptured braking power and upon whether a desired regenerative braking flag indicates that the capturing of regenerative energy is desired under current vehicle operating conditions; and integrating the brake pedal position modifier within appropriate saturation limits to determine an optimum brake pedal position.

* * * * *